United States Patent [19]

Sharps, Jr.

[11] Patent Number: 4,784,594
[45] Date of Patent: Nov. 15, 1988

[54] SINGLE LIP ROTARY TUBULAR EXTRUSION DIE

[75] Inventor: Gordon V. Sharps, Jr., Fairport, N.Y.

[73] Assignee: Mobil Oil Corporation, New York, N.Y.

[21] Appl. No.: 21,630

[22] Filed: Mar. 3, 1987

Related U.S. Application Data

[62] Division of Ser. No. 821,935, Jan. 24, 1986, abandoned, which is a division of Ser. No. 474,630, Mar. 11, 1983, abandoned.

[51] Int. Cl.$^4$ ............................................. B29C 47/24
[52] U.S. Cl. ................................. 425/131.1; 264/173; 264/209.2; 425/133.1; 425/381; 425/462; 428/910
[58] Field of Search ............ 425/131.1, 133.1, 192 R, 425/324.1, 326.1, 392, 381, 461, 462, 466, 467; 264/171, 173, 176.1, 211.1, 273, 564, 569, DIG. 81, 209.2; 156/244.14, 500; 428/137, 36, 112, 910; 526/352

[56] References Cited

U.S. PATENT DOCUMENTS

| | | | |
|---|---|---|---|
| 2,957,201 | 10/1960 | Fields et al. | 425/466 X |
| 3,281,897 | 11/1966 | Mercer | 425/133.1 X |
| 3,349,437 | 10/1967 | Quackenbush | 425/462 |
| 3,360,821 | 1/1968 | Marcus et al. | 264/211.1 |
| 3,387,331 | 6/1968 | Billings | 425/381 X |
| 3,440,686 | 4/1969 | Corbett | 425/466 |
| 3,540,078 | 11/1970 | Schultz | 425/381 X |
| 3,546,743 | 12/1970 | Roth | 425/381 X |
| 3,565,985 | 2/1971 | Schrenk et al. | 264/171 |
| 3,590,432 | 7/1971 | Schott, Jr. | 425/192 R |
| 3,642,396 | 2/1972 | Meneidis | 425/381 X |
| 3,666,389 | 5/1972 | Nelson | 425/324.1 |
| 3,713,924 | 1/1973 | Fairbanks | 264/DIG. 81 |
| 3,759,647 | 9/1973 | Schrenk et al. | 264/171 |
| 3,768,949 | 10/1973 | Upmeier | 425/392 |
| 3,853,661 | 12/1974 | Sudo | 156/500 |
| 3,933,960 | 1/1976 | Cameron et al. | 264/173 |
| 3,966,861 | 6/1976 | Papesh et al. | 264/173 |
| 4,009,975 | 3/1977 | Ninomiya et al. | 264/569 |
| 4,011,128 | 3/1977 | Suzuki | 264/569 |
| 4,111,630 | 9/1978 | Shiomi et al. | 425/462 |
| 4,176,155 | 11/1979 | Heisterkamp et al. | 264/564 |
| 4,201,532 | 5/1980 | Cole | 425/326.1 X |
| 4,277,594 | 7/1981 | Matthews et al. | 526/352 |
| 4,358,330 | 11/1982 | Aronovici | 156/244.14 |
| 4,368,017 | 1/1983 | Rasmussen | 425/133.1 |
| 4,403,934 | 9/1983 | Rasmussen | 425/381 X |
| 4,420,451 | 12/1983 | Rasmussen | 425/133.1 |
| 4,426,343 | 1/1984 | Vittone et al. | 428/137 |
| 4,430,287 | 2/1984 | Rasmussen | 425/133.1 |

FOREIGN PATENT DOCUMENTS

| | | | |
|---|---|---|---|
| 1930987 | 6/1969 | Fed. Rep. of Germany | |
| 2264020 | 12/1972 | Fed. Rep. of Germany | |
| 2915835 | 4/1976 | Fed. Rep. of Germany | |
| 2626351 | 6/1976 | Fed. Rep. of Germany | |
| 49-49185 | 12/1974 | Japan | 425/133.1 |
| 51-26971 | 3/1976 | Japan | 425/133.1 |
| 56-155725 | 12/1981 | Japan | 425/462 |
| 57-6739 | 1/1982 | Japan | 425/133.1 |

*Primary Examiner*—Richard L. Chiesa
*Attorney, Agent, or Firm*—Alexander J. McKillop; Michael G. Gilman; Charles J. Speciale

[57] ABSTRACT

Disclosed is a single lip tubular extrusion die in which a plurality of separate melt streams passing through respective annular flow paths are fed to a common annular flow passage extending axially to and terminating at a die orifice. The annular flow passage is connected to the annular flow paths through respective groups of holes spaced annularly about the die axis. Each group of holes has its openings to the common annular flow passage spaced a different radial distance from the die axis to allow the separate melt streams to be layered in the common annular flow passage and co-extruded. One of the die lips is rotatable so that each melt stream produces a uniform layer of polymer in the extruded film while imparting a molecular orientation to the extruded film in the transverse direction (TD). An extruder-type seal may be provided adjacent a gap between a rotating and stationary part of the die to force melt attempting to penetrate the gap into the annular flow passage.

1 Claim, 2 Drawing Sheets

SINGLE LIP ROTARY TUBULAR EXTRUSION DIE

This application is a division of application Ser. No. 821,935 filed Jan. 24, 1986 which is a division of application Ser. No. 474,630 filed Mar. 11, 1983, both applications now abandoned.

BACKGROUND OF THE INVENTION

1. Field of the Invention

The present invention relates to a tubular extrusion die and, more particularly, to a single lip rotary tubular extrusion die for making a multi-layer co-extruded plastic film.

2. Discussion of the Prior Art

It is known that a tubular extruded thermoplastic film has a high degree of molecular orientation in the machine direction (MD) and a relatively low degree of molecular orientation in the transverse direction (TD) (sometimes referred to as the cross direction (CD)), causing an extruded thermoplastic film to have a low mechanical strength in the transverse direction. It is also known that a tubular extruded thermoplastic film can be stretched, as by blown expansion, to improve the molecular orientation, structural integrity and strength properties in the transverse direction. However, the amount of transverse direction orientation which can be imparted to an extruded film by blown expansion is limited by the degree to which the film can be stretched without breaking. In general, it would be desirable to increase the amount of transverse direction orientation of a thermoplastic film prior to expansion to increase its strength in that direction.

Attempts have been made to rotate a tubular die during extrusion to partially orient to molecular chains in a transverse direction to help offset the general machine direction orientation of the molecules which normally occur during extrusion. One such attempt in illustrated in U.S. Pat. No. 4,358,330. However, it is generally difficult to rotate an entire die requiring a complex and expensive die supporting structure. Moreover, since orientation inherently takes place outside of the die, there is a limit to how much transverse direction orientation can be imparted to the film because of the location of the frost line. Furthermore, too much twisting of the plastic melt will cause collapse of the tubular film, making this method of obtaining transverse direction orientation difficult to properly implement.

Another problem typically associated with tubular extrusion dies is the attainment of a uniform distribution of melt circumferentially of the die which is required if a uniform extrusion of melt in the thermoplastic film is desired. Prior art dies require the use of high internal pressure drops to circumferentially distribute the melt about the die which in turn requires very close internal tolerances in the flow paths, making machining tolerances very critical and further adding to the cost and complexity of the die. These high pressure drops also limit the output of material through a die.

It is also frequently desired to impart particular structural properties to an extruded film by layering melts of the same or different thermoplastic materials in the extruded film. This too requires a complex die construction which must be machined to a high tolerance to ensure a uniform layering of the various melts in the extruded film.

Prior art extrusion dies are also typically constructed to produce a single type of extruded film product from a particularly thermoplastic material. For extrusion of different types of films, using different units, different dies are required, which adds to the expense of an extrusion plant.

Another problem particularly associated with dies which contain a rotary part is that they must be sealed at various locations between rotating and non-rotating parts to prevent the escape of a melt during extrusion. Sealing is particularly difficult and expensive as high extrusion pressures are developed.

SUMMARY OF THE INVENTION

The present invention is directed to a unique die construction which is designed to improve upon and overcome the deficiencies noted above with respect to prior art dies.

A first object of the invention is the provision of a rotary tubular extrusion die which is relatively simple in construction and inexpensive to build, but which is capable of achieving a substantial transverse direction (TD) orientation of the polymer molecules in an extruded film, thus reducing the blow up ratio (BUR) required to attain a desired TD/MD orientation balance.

Another object of the invention is the provision of a tubular extrusion die in which the melt is uniformly distributed circumferentially of the die by rotation of at least one die part relative to another about the die axis.

Another object of the invention is the provision of a rotary tubular extrusion die which has a reduced overall pressure drop therethrough, permitting easier conversion from one extrusion melt to another, while reducing the amount of energy required to pump a melt through the die.

Another object of the invention is the provision of a tubular extrusion die for producing a multi-layer extrusion which achieves a uniform layering of separate melts in the extrusion film by rotation of at least one die part relative to another about the die axis.

Another object of the invention is the provision of a tubular extrusion die in which one part of the die bound by an extrusion flow chamber may be rotatable relative to another part and in which separate melt streams are conducted to an extrusion flow passage by respective groups of holes arranged annularly about the die axis. The holes provide a layered extruded film which may have different layering characteristics depending on whether the one part of the die is rotated or not.

Another object of the invention is the provision of a rotary tubular extrusion die having a unique extruder type seal which positively forces melt attempting to escape from an extrusion path back into the extrusion path.

Another object of the invention is the provision of an extrusion method for forming a thermoplastic film having improved molecular orientation and strength characteristics in a transverse direction.

Another object of the invention is the provision of a unique extruded tubular film wherein the wall thereof is formed by a stripped pattern of material layers oriented obliquely with respect to the wall inner and outer surfaces.

These and other objects, features and advantages of a die constructed in accordance with the invention will be more readily discerned from the ensuing detailed description which is provided in connection with the accompanying drawings.

DETAILED DESCRIPTION OF THE INVENTION

Figure 1:
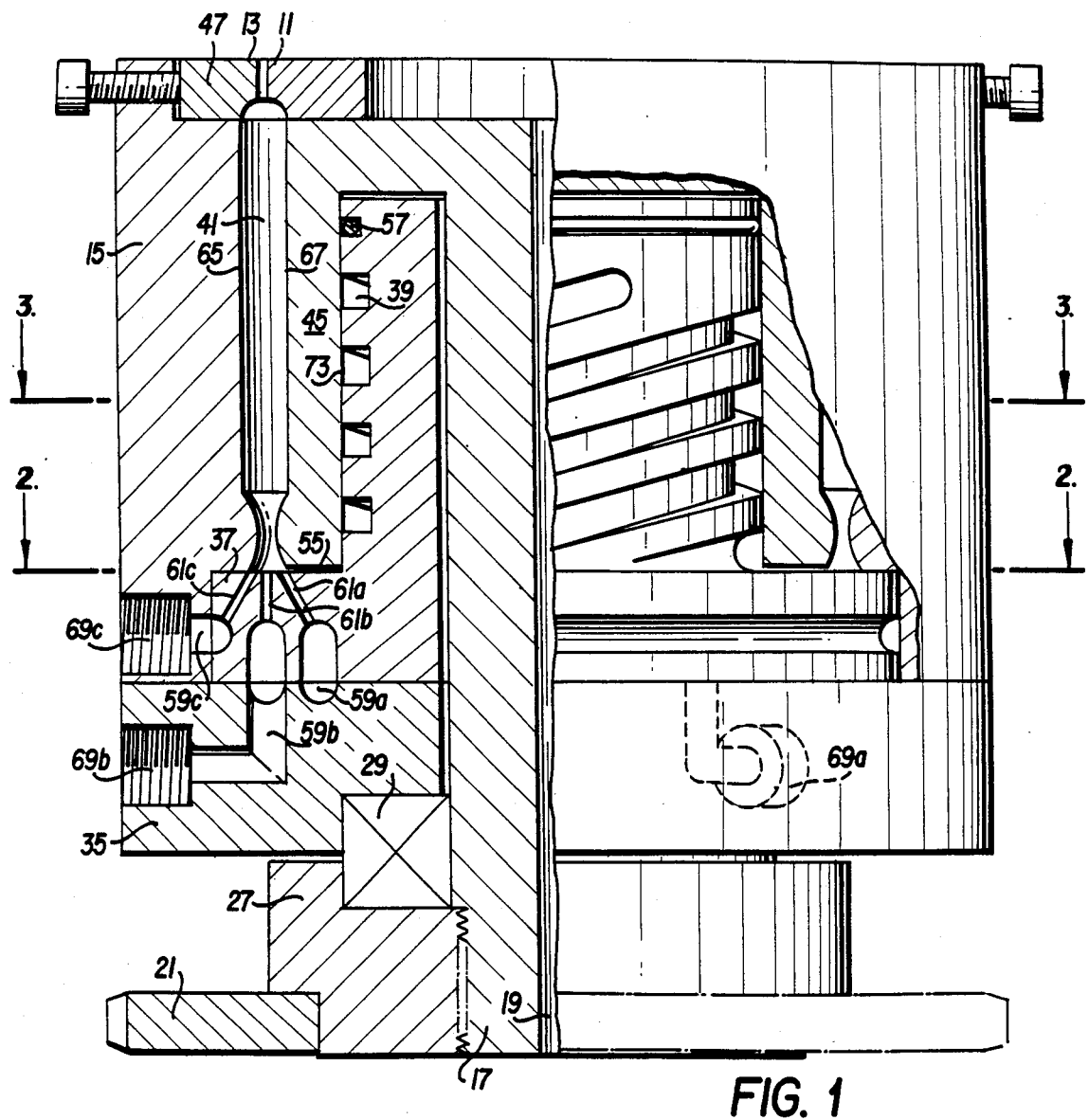
FIG. 1 shows a partially cutaway side sectional view of a tubular extrusion die constructed in accordance with the teachings of the invention.
Figure 2:
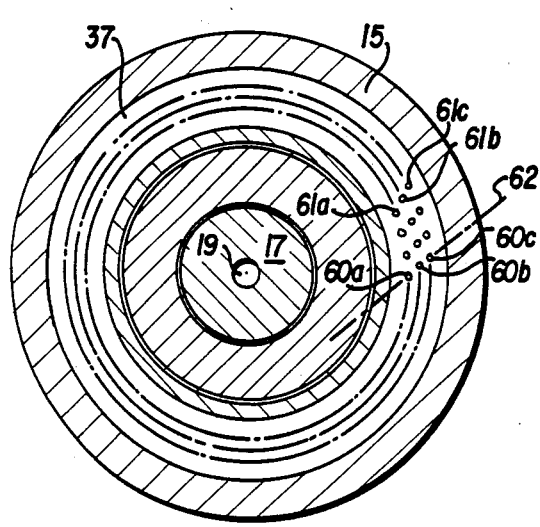
FIG. 2 shows a sectional view of the FIG. 1 die taken along the line 2—2.

FIGS. 1 and 2 illustrate a die constructed in accordance with the teachings of the invention.

The die includes an outer die body 15 having an interior peripheral wall 65 which defines one side of an annular flow passage 41. The other side of annular flow passage 41 is formed by an outer peripheral surface 67 of a rotary wall 45. The annular flow passage 41 terminates at a die orifice formed by an inner die lip 11 and an outer die lip 13 respectively provided at the rotary wall 45 and outer die body 15. Surface 67 and wall 65 are also inner and outer die walls, respectively.

A thermoplastic polymer melt is introduced into the annular flow passage 41 by a plurality of annular melt inlet passages 59a, 59b and 59c. These annular melt inlet passages are formed in a distribution plate 35 and a melt seal/distribution block 37 and are respectively connected to melt inlet orifices 69a, 69b and 69c.

The polymer melt flows into the annular flow passage 41 from the annular melt inlet passages 59a, 59b and 59c through respective concentric groups of holes 61a, 61b and 61c provided in the melt seal/distribution block 37. These holes, which have openings into annular flow passage 41 equally spaced in each group, are shown in greater detail in FIG. 2. Each group of holes, e.g. 61a, is on a fixed common radius from the die axis. The different groups of holes 61a, 61b and 61c are each on a different radius, as shown in FIG. 2. In addition, the holes of one group are shifted, in a circumferential direction, i.e., radially off-set, relative to the holes of another group, so that respective holes 60a, 60b, 60c from all three groups align on line 62, as illustrated in FIG. 2.

The arrangement of the groups 61a, 61b and 61c of holes in the melt distribution block 37 causes polymer melts respectively introduced at inlet orifices 69a, 69b and 69c to be layered in the annular flow passage 41 to thus form a layered co-extrusion of the melts. The manner in which this layering is achieved, and the manner in which it is affected by die rotation, will be described in greater detail below.

Distribution plate 35 includes a bearing 29 which provides thrust support and radial location of a rotary wall input shaft 17.

The die further includes the rotary wall input shaft 17 in which is formed a gas passage 19 which extends throughout the entire axial length of the die. Gas passage 19 is used to blow and expand an extruded polymer film, as well known in the art.

A sprocket 21 is attached to the rotary wall input shaft 17 so that the former drives the latter in rotation. A suitable driving source (not shown) is coupled to sprocket 21 by means of a driving chain.

A bearing retainer 27 is provided which supports both the bearing 29 and the sprocket 21. Driving movement of shaft 17 by rotation of sprocket 21 in turn causes rotation of rotary wall 45.

The stationary melt seal/distribution block 37 which surrounds shaft 17 is connected with the distribution plate 35. The melt seal/distribution block 37 has a cylindrical upper portion which has on its outer circumferential periphery a screw thread 39 forming flight channels of an extruder-type seal. The other part of the extruder type seal is formed by the inner peripheral surface 73 of the rotary wall 45. The screw threads 39 and wall 73 are arranged such that rotation of rotary wall 45 by shaft 17 causes an extruder effect which forces any polymer melt tending to escape from the annular flow passage 41 through a gap 55 existing between the bottom of rotary wall 45 and top of melt seal/distribution block 37 back into the annular flow passage 41. The extruder-type seal is highly effective in preventing loss of polymer melt even when it is under considerably high pressure.

A die orifice adjustment ring 47 is provided which is fixed to the outer die body 15 and is adjustable in position to properly set the width existing between the inner die lip 11 and outer die lip 13 about the entire die orifice.

Figure 6:
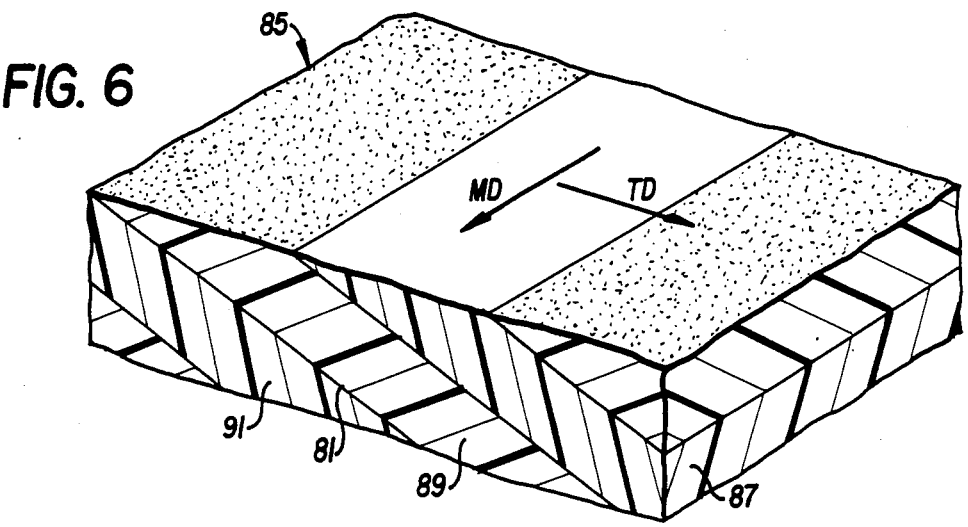
FIG. 6 shows a perspective view of a portion of a unique three layer polymer film produced by the FIG. 1 die.

As noted, the holes which are provided in the melt seal/distribution block 37 open into the annular flow passage 41 in the manner illustrated in FIG. 2. Each group of holes is respectively fed from one of the annular melt inlet passages 59a, 59b and 59c which are connected to respective melt inlet orifices 69a, 69b or 69c. As a result, different polymer streams respectively emanate from each of the groups of holes 61a, 61b and 61c. This causes a layering of the polymer streams in the annular flow passage 41. If the FIG. 1 die is used as a straight tubular flow through die, without rotation of wall 45, the polymer streams which are combined in the annular flow passage 41 will cause an overlapping stripped polymer stream pattern in the extruded polymer film, as shown in FIG. 6. The weld line 81, or line of material juncture caused by the holes 61a, 61b, 61c, is not perpendicular to the film surface as is normally the case, but forms a long diagonal line through the thickness of film 85. That is, the stripped layers 87, 89, 91 are oriented obliquely with respect to the inner and outer surfaces of the film wall. In this way the weld line is as strong as the surrounding material, showing no tear propensity.

Figure 5:
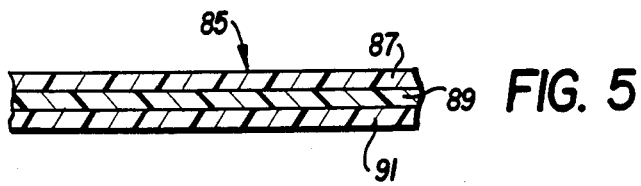
FIG. 5 shows a three layer polymer film produced by the FIG. 1 die.

If rotation is imparted to rotary wall 45, the respective polymer streams will be uniformly distributed in flow passage 41 circumferentially of the die, but will form individual layers 87, 89, 91 within annular flow passage 41, which appear in the extruded film 85, as shown in FIG. 5. As a result, an extruded polymer film is produced having a number of layers of uniformly distributed melt corresponding to the number of melt streams introduced into annular flow passage 41. In the die illustrated in FIG. 1, three such flow streams will be present; however, it should be appreciated by those skilled in the art that the number off low streams (hole groups and annular flow paths) may be reduced or increased depending on the layering effect desired in the extruded film.

It is found that even a moderate degree of rotation of rotary wall input shaft 17, e.g., approximately 2 RPM, is sufficient to produce the FIG. 5 uniform layering of the polymer streams in the extruded film.

Because a uniform layering of the melt streams is produced upon rotation of the rotary wall 45, the layer ratios or thickness of the extruded polymer streams can be controlled solely by the flow rates of the polymer streams through the melt inlet orifices 69a, 69b and 69c. Additional, complex, internal die structures are not required to regulate layer thickness or distribute a melt circumferentially.

The melt pressure in gap 55 which serves to load bearing 29 also has a tendency to cause melt to be squeezed out of the die and into the space between the stationary seal/distribution block 37 and the inner peripheral surface 73 of rotary wall 45. If high melt pressures are involved, this would be a difficult leakage path to seal. To seal this path, the present invention employs the extruder-type seal with the screw threads 39 provided on the outer peripheral surface of melt seal/distribution block 37 cooperating with the rotating inner peripheral surface 73 of the rotary wall 45. The inner peripheral surface, in effect, acts as the barrel of an extruder during rotation forcing any melt in the area between the stationary block 37 and movable wall 45 back through gap 55 and toward the annular flow passage 41. A seal 57 may be employed to prevent the passage of melt beyond the extrusion type seal only at times of no rotation. That is, when the extruder type seal is not effective.

In addition to its ability to uniformly distribute a plurality of melt streams, the die as illustrated in FIG. 1 has several other unique characteristics associated with rotation of wall 45, one of which is the ability to impart a transverse direction (TD) orientation of the polymer molecules during the extrusion process, thus improving the TD/MD orientation balance of the extruded product. When rotation is employed, the extruded film has improved TD/MD orientation balance, thereby reducing the required blow up ratio (BUR) to attain a particular desired transverse molecular orientation. The FIG. 1 die is particularly useful in extruding a high molecular weight material, such as high density high molecular weight polyethylene, as a desired MD/TD molecular orientation balance can be attained without employing a high stalk extrusion process.

Figure 3:
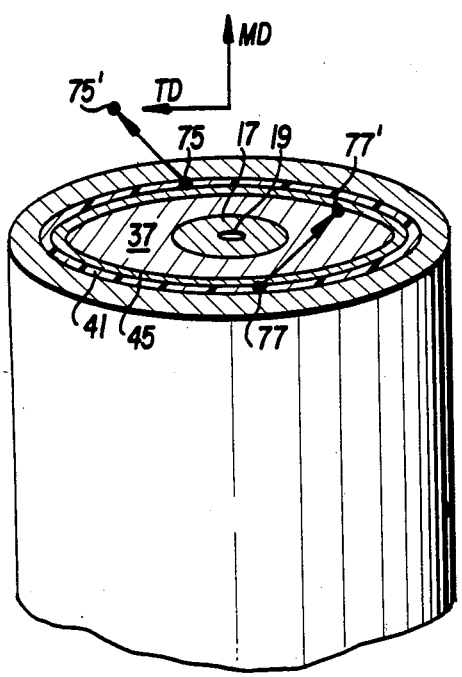
FIG. 3 is a partly schematic representation of the FIG. 1 die showing the molecular orientation of a film produced therewith.
Figure 4:
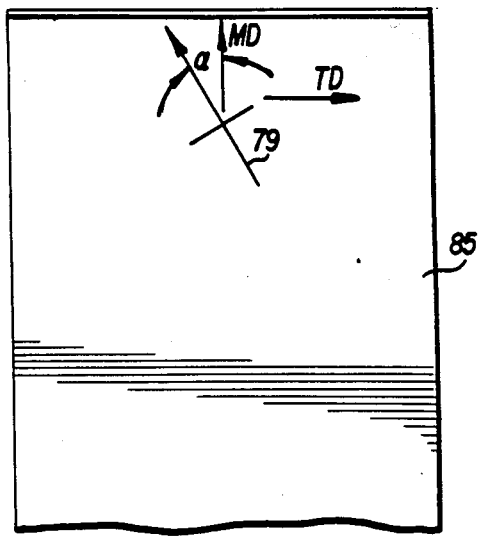
FIG. 4 shows one side of a tubular film produced by the die of FIG. 1 and its molecular orientation.

FIG. 3 is a schematic representation of a portion of the annular flow passage 41 of the FIG. 1 die along the line 3—3. FIG. 3 illustrates what happens to a polymer melt in the die during extrusion and upon rotation of the movable wall 45. A particular point in the extruded film shown as 75 in FIG. 3 during extrusion will move not only in a machine direction, but will also move in a circumferential direction of the die to a point illustrated as 75'. Likewise, a point 77, on an opposite side of the extruded film, will move during extrusion to a point illustrated as 77'. This directional movement causes a transverse direction molecular orientation in the extruded film. FIG. 4 illustrates the extruded tubular film 85 and shows the directional molecular orientation imparted to a wall thereof. Strength tests conducted on films produced with the FIG. 1 die with wall 45 rotating illustrate how a more balanced MD/TD orientation in the walls of an extruded film is achieved. In these tests a single thermoplastic resin, either a low density polyethylene (LDPE) or a high density high molecular weight polyethylene (HDHMWPE), was extruded through annular flow passage varying rates of rotation of wall 45. A standard (non-high stalk) extrusion was employed. For the LDPE the melt temperature was 400° F., the melt was extruded at the rate of 130 lb/hr and a blow-up ratio of 2.2 was employed. For the HDHMWPE the melt temperature was 480° F., the melt was extruded at the rate of 185 lb/hr and a blow-up ratio of 3.1 was employed. The tests for the respective resins are summarized in the Table below.

TABLE

| MATERIAL | SAMPLE # | ROTATION RPM | MD STRENGTH | | | | TD STRENGTH | | | |
|---|---|---|---|---|---|---|---|---|---|---|
| | | | GAUGE MILS | MAX PSI AT BREAK | ELONG % AT BREAK | ELMENDORF TEAR GM/MIL | GAUGE MILS | MAX PSI AT BREAK | ELONG % AT BREAK | ELMENDORF TEAR GM/MIL |
| LPDE | A | 0 | 1.51 | 3276 | 264 | NO DATA | 1.51 | 2288 | 656 | NO DATA |
| | B | 5 | 1.62 | 2956 | 269 | | 1.59 | 2490 | 616 | |
| | C | 10 | 1.64 | 2875 | 368 | | 1.61 | 2647 | 595 | |
| | D | 15 | 1.60 | 2732 | 401 | | 1.72 | 2556 | 571 | |
| | E | 20 | 1.72 | 2591 | 474 | | 1.77 | 2445 | 510 | |
| HDHMWPE | A | 2.5 | .92 | 8489 | 491 | 11.3 | .94 | 4109 | 715 | 740 |
| | B | 5 | .91 | 8015 | 480 | 13.4 | .9 | 5026 | 788 | 633 |
| | C | 7.5 | .89 | 8571 | 552 | 19.7 | .93 | 5139 | 795 | 626 |
| | D | 10 | .94 | 7091 | 525 | 20.8 | .97 | 5325 | 819 | 367 |
| | E | 15 | .95 | 6741 | 497 | 24.8 | .96 | 5146 | 667 | 235 |
| | F | 17.5 | .97 | 6887 | 533 | 29.1 | .98 | 5058 | 683 | 147 |
| | G | 5 | .67 | 9537 | 428 | 11.6 | .65 | 4592 | 680 | 644 |
| | H | 10 | .67 | 8922 | 445 | 14.9 | .69 | 4254 | 553 | 656 |
| | I | 15 | .75 | 7368 | 433 | 21.5 | .75 | 4508 | 606 | 408 |

As illustrated in the above table, as the rate of rotation of rotary wall 45 increases, the strength properties of the extruded film in the MD and TD directions converge toward one another (the MD strength decreasing, the TD strength increasing) so that a greater degree of MD/TD molecular balance is achieved in the extruded film. As also shown, a near balance of MD/TD molecular orientation can be achieved with high rate of rotation.

When different polymer melt streams are introduced into the FIG. 1 die, the rotary movement of movable wall 45 causes a uniform distribution of the various melt streams in the extruded product without requiring any particular internal die structures to induce pressure drops to ensure uniform melt distribution. Thus, the melt streams can flow through the die with reduced melt pressure. Moreover, since the die illustrated in FIG. 1 does not use particular internal structures to induce pressure drops, it can be used with many different types of polymer melts having different flow characteristics without difficulty.

The FIG. 1 die can also be used to construct specialty type extruded films. For example, if the movable wall 45 is not rotated during extrusion, the stripped effects in the wall of the extruded film shown in FIG. 6 can be obtained.

The extrusion type seal ensures that even with very high extrusion pressures, there will be no leakage of the melt from the die, thus allowing high extrusion pressures to be used.

The die of the invention may be used to extrude many different thermoplastic materials including polyethylene, polypropylene, polystyrene and others.

While preferred embodiments of the invention have been shown and described, it should be understood that various modifications can be made thereto without departing from the spirit or scope of the invention. Accordingly, the invention is not limited by the foregoing description, but is only limited by the scope of the claims appended hereto.

I claim:

1. A tubular extrusion die for producing a tubular extruded film from a plurality of melt streams comprising:

an outer die wall and an annular rotary inner wall respectively defining at a first terminating end thereof outer and inner lips of an annular outlet orifice for the extrusion of a polymer melt film;

an annular flow passage defined by said outer and inner walls and extending axially of said die for supplying a polymer melt to said outlet orifice; a melt/seal distribution block having an upper stationary cylindrical inner support member positioned radially inwardly of said annular rotary wall and extending axially of said die, at least one extruder flight channel on the outer circumference of said cylindrical support member, said rotary wall defining one side of said annular flow passage, the opposite side of said rotary wall from said annular flow passage surrounding said cylindrical support member to form, with said extruder flight channel, an extruder seal for forcing melt entering into a space between said cylindrical support member and said rotary wall from said annular flow passage back into said annular flow passage;

a distribution plate having a plurality of annular melt inlet passages for supplying separate melt streams to said annular flow passage;

said melt/distribution block also having a plurality of concentric groups of annularly arranged holes, each group being arranged between said outer and inner walls and interconnecting a respective melt inlet passage with said flow passage so that each of said groups of holes feeds a melt stream from a respective melt inlet passage directly into said annular flow passage which guides the melt stream from a respective melt inlet passage together with the melt stream from another hole group, to said outer and inner lips; and means for rotating said inner wall for imparting transverse molecular orientation to a polymer melt extruded through said outlet orifice and produce a uniform layering of melt from said melt streams in said extruded film.

* * * * *